United States Patent [19]

Carre et al.

[11] Patent Number: 4,961,996
[45] Date of Patent: Oct. 9, 1990

[54] NON-STICK COATINGS ON GLASS

[75] Inventors: Alain R. E. Carre, Le Chatelet en Brie; Francoise M. M. Roger, Avon, both of France

[73] Assignee: Corning Incorporated, Corning, N.Y.

[21] Appl. No.: 288,689

[22] Filed: Dec. 22, 1988

[30] Foreign Application Priority Data

Jan. 5, 1988 [FR] France ................................ 88 00025

[51] Int. Cl.$^5$ ........................ B32B 17/10; B32B 27/08
[52] U.S. Cl. .................................... 428/421; 428/422; 428/429; 428/435; 428/447; 428/448; 428/473.5
[58] Field of Search ...................... 428/473.5, 422, 447, 428/421, 435, 448, 429; 528/183

[56] References Cited

U.S. PATENT DOCUMENTS

| | | | |
|---|---|---|---|
| 3,260,691 | 7/1966 | Lavin et al. | 528/183 X |
| 3,558,345 | 1/1971 | Baum et al. | 428/422 |
| 4,329,399 | 5/1982 | Swerlick | 428/473.5 X |
| 4,353,950 | 10/1982 | Vassiliou | 428/473.5 X |
| 4,562,119 | 12/1985 | Darms et al. | 428/473.5 X |
| 4,639,344 | 1/1987 | Ueno et al. | 428/473.5 X |
| 4,778,727 | 10/1988 | Tesoro et al. | 428/473.5 X |
| 4,808,473 | 2/1989 | Brooks | 428/473.5 X |

Primary Examiner—Thomas J. Herbert
Attorney, Agent, or Firm—Kees van der Sterre; Walter S. Zebrowski

[57] ABSTRACT

Articles with a non-stick coating. An article consisting of a substrate whose surface has —OH groups, and of at least one non-stick polymer layer, said article having also, applied between said substrate and said non-stick polymer layer, a layer which is obtained by making an appropriate bifunctional organo-silane react with a polyamic-acid precursor of polyamide-imide and with —OH groups of the substrate surface, then drying and converting said polyamic-acid into a polyamide-imide by heating at an appropriately high temperature.

4 Claims, No Drawings

NON-STICK COATINGS ON GLASS

BACKGROUND OF THE INVENTION

The present invention sets forth an article provided with a non-stick coating whose adhesion to the aforesaid article and durability are improved, a manufacturing process for such an article, and a composition suitable to improve the adhesion of a non-stick coating to an article.

The non-stick coatings used to produce cookware to which food does not stick during cooking are usually based on fluorocarbon polymers, such as for example, polytetrafluoroethylene (PTFE), FEP, and the like, or on silicones.

When the article to be coated is a metallic substrate, such as aluminum or cast iron, gritblasting with an abrasive is usually recommended to insure adhesion of the coating to the substrate.

When the substrate is glass or glass ceramic, gritblasting is not suitable, in particular for a PTFE coating. Because of the porosity of the coating, the polymer/substrate interface is, in use, rapidly exposed to water detergents and grease, so that the adhesion of the coating to the substrate, which is mainly a kind of anchoring, is not sufficient to avoid staining or delamination on the aforesaid interface. The damage is particularly visible when the substrate is a transparent glass, such as Pyrex$^R$ brand cookware.

In order to improve adhesion of the non-stick coating to the substrate of the article to be coated, it was proposed in the U.S. Pat. No. 3,558,345, to use aminoalkyl-trialkoxysilanes as coupling agents applied on the substrate before application of the non-stick coating. Typically the glass substrate is dipped into a diluted solution of the silane coupling agent for sufficient time, approximately 5 min. to 4 hrs., so as to have hydrolysis of the alkoxy groups, then condensation of the resulting —OH groups with the silanol (=SiOH) groups existing at the glass surface (see E.P. PLUEDDEMAN, Silylated surfaces, edited by D.E. Leyden and W. Collins, Gordon and Breach Science Publishers, N.Y., 31, 1978). Besides, the aminoalkyl groups have a high (bonding) interaction with the organic coating. Nevertheless for the condensation reaction to develop sufficiently, it is necessary for the substrate surface to be exempt from grease or other organic pollutants. Consequently the surface to be coated has to be thoroughly cleaned with a detergent or an organic solvent, such as alcohol, acetone and the like, then dried, to insure that silanol groups are present on the aforesaid surface, which process is, on an industrial scale, a serious inconvenience. Moreover this process is valid only for glass substrates.

SUMMARY OF THE INVENTION

There is consequently a need for a process allowing a good adhesion between a non-stick coating and a substrate, and being simpler to operate.

The purpose of the present invention is to satisfy this need, as well as others in addition.

More precisely, the invention sets forth a process to manufacture an article consisting of a substrate whose surface has —OH groups and of at least one non-stick polymer layer covering on said surface at least in part. The process comprises applying to at least one part of the surface a polyamic-acid precursor of polyamide-imide and an organosilane with two types of functional groups, one of them being reactive with the —OH groups of the substrate surface, the other type being reactive with the polyamic-acid, said polyamic-acid and silane being applied as a mixture in one layer, or one application, or successively, first the silane and secondly the polyamic-acid. The structure is then heated up to an appropriate temperature, the polyamic-acid is dried and converted into a polyamide-imide. Finally the non-stick coating or coatings are applied.

The invention also sets forth an article consisting of a substrate whose surface has —OH groups and of at least one layer of a non-stick polymer covering at least partially said surface, said article being characterized in that in addition it contains, between aforesaid substrate and non-stick polymer layer, a layer which is the product resulting from the reaction of an organosilane with two types of functional groups, one of them being susceptible to react with the —OH groups of the substrate surface, and the other type being susceptible to react with the polyamic-acid, said reaction being with a polymeric-acid precusor of polyamide-imide and with the —OH groups of the substrate surface, then drying and converting the polyamic-acid into a polyamide-imide solid film by heating up to an appropriate temperature.

The present invention further sets forth a composition useful to improve the adhesion of a non-stick coating with a substrate, said composition characteristically consisting of a polyamic-acid precursor of polyamide-imide, and an organosilane with two types of functional groups, one of them being susceptible to react with the —OH groups of the substrate surface, and the other type being susceptible to react with the polyamic-acid.

These and additional objects, features and advantages of the present invention will become apparent to those skilled in the art from the following detailed description.

DESCRIPTION OF THE PREFERRED EMBODIMENTS

Synthesis of polyamide-imide is described in, for example, "HEAT-RESISTANT POLYMERS", J.P. CRITCHELY, G.J. KNIGHT and W.W. WRIGHT, Plenum Press, N.Y., 207, 1983.

The polyamic-acid precursors will be preferably used, for safety and antipollution reasons, as aqueous compositions. Such compositions are described in the French Pat. No. 1,460,157, applied on Nov. 10, 1965 by Imperial Chemical Industries, where further details can be found. In those aqueous compositions, the polyamic-acid is found as a salt either of ammonium or of an organic base. The conversion into a polyamide-imide is usually made by heating.

An example of a polyamide-imide prepolymer composition, commercially available is code 8470 A XYLAN$^R$ from Whitford Plastics Ltd. of Brindley 86, Astmoor, Runcorn, Cheshire, WA71PF, Great Britain and from Whitford Corporation of West Chester, Pa. 19381, USA.

If desired, polyamic-acid solution in organic solvents could be used. One familiar with the art can easily find, in the plentiful published literature dedicated to polyamic-acids and to polyamides-imides, details about preparation of such solutions in an organic solvent. The following two patents are quoted only as examples: British Pat. No.898–651 and U.S. Pat. No. 3,260,691.

Suitable pigmentation of the polyamide-imide prepolymer allows to obtain decorating effects for transparent substrates such as PYREX[R] and VISION[R] substrates, the color of this first layer being visible through the substrate.

The organosilane to be used must have two types of functional groups. One of those types must be reactive with the —OH groups present at the surface of the substrate to be coated, and possibly belonging to silanol groups or to Me—OH groups where Me is a metal. An example of groups of this type is the hydroxy group. Nevertheless, since hydroxysilanes are not very stable, alkoxysilanes are preferred, and they have to be hydrolized into hydroxysilanes just when they are used or a short time before. The other type must be reactive with the polyamic-acid. An example of such groups is the amino group.

Among the useful organosilanes are consequently the amino or polyamino-silanes. Among those, the preferred ones are, thus far, gamma-aminopropyltriethoxysilane, gamma-aminopropyltrimethoxysilane and N-(beta-aminoethyl)-gamma-aminopropyltrimethoxysilane, which have furthermore the advantage of being approved by the U.S. F.D.A., which is important when the final articles are intended for cooking usage. The functional silane is more easily used as an aqueous or alcoholic solution, added shortly before use (maximum 1 h) to the aqueous solution of polyamic-acid.

As a guidance, the silane amount can be 1 to 10% by volume of the total composition, preferably 1 to 5. As a variation, the silane and the polyamic-acid can be applied successively on the substrate to be coated. The dry extract of the final composition including resin and pigments, is usually between 10 and 22% by volume. The pigments are those usually included in the commercial polyamic-acid compositions.

The polyamic-acid and silane applied to the substrate are heated to an appropriate temperature, for example 100° to 225° C., during a few minutes for drying of the layer or layers, and conversion of the polyamic-acid into a polyamide-imide film. A thickness of a few micrometers, for example 5–20 μm, is sufficient for the coating of polyamide-imide modified by silane to fulfill the purpose of the invention.

In addition, the non-stick coating composition can be applied, in conventional way, as one or several successive layers, according to the manufacturer's prescriptions. Examples of suitable coating compositions are those based on PTFE supplied by E. I. DuPont de Nemours, Inc., Wilmington, Del., and the coating composition based on silicones supplied by Dow Corning Corp., Midland, Mich.

Silane provides a high degree of adhesion, chemical in nature, with the substrate because of the condensation reaction of the —OH groups coming from hydrolysis of the alkoxy groups of the silane, with the —OH groups of the substrate surface. On the other side the amino groups of the silane create chemical bonds with the polyamic-acid and consequently with the final polyamide-imide. Finally experiments have indicated that the non-stick coatings adhere very well to the polyamide-imide layer modified by silane.

The following non-limitative examples are given to better illustrate the invention.

In these examples, polyamide-imides of types 1 and 2 (PAI-1, PAI-2), as classified according to the Recommendation LI of the Bundesgesundheitsamt issued as Communication 160 in the Bundesgesundheitsblatt Vol. 26, No. 7, July 1983, p. 219-211, have been successfully used. Further, in these examples, the following tests have been used:

ADHESION TEST

Since the usual tests for coatings, such as the cross hatch test and the thumb nail test, are mainly qualitative, we have developed a test designed to quantify the adhesion of the non-stick coating with the substrate.

This test, called plough test, consists in measuring, with a dynamometer, the force F necessary to remove the coating from the substrate by means of a tungsten carbide blade, the plough share, 2.5 mm long, making a 45° angle with the substrate, and on which a load P of 6.5 newtons is applied. To measure the coating adhesion on a substrate, one measures first the friction force $F_F$ of the blade on a part of the substrate without non-stick coating, then one measures the force $F_T$ necessary to remove the non-stick coating from the substrate when the blade is moved perpendicularly to itself at a speed of 50 μm/s. The difference $F_T-F_F=F$ measures the adhesion between the non-stick coating and the substrate. The test is made at 25±2° C. and a relative humidity 50±5%. An average F is calculated from 9 measurements on three samples 5.8×5.8 cm.

CHEMICAL DURABILITY ACCELERATED TESTS

A first test consists in soaking non-stick coated samples in a solution with 3% by weight of sodium carbonate at 95° C. for the indicated time. After this soaking, the adhesion force F is measured with the aforesaid adhesion test.

A second test, closer to real usage, consists in determining the number, N, of washes in a conventional dishwasher which the article can withstand before any damage appears, such as staining, delamination, peeling of the coating, and the like.

THERMAL AGING TEST

This test consists in heating non-stick coated samples in an oven at 200° or 250° C. for 6 days, then submitting them to the plough test.

EXAMPLE 1

In this example, we compare the adhesion of a non-stick coating, about 35 μm thick, consisting of two layers of PTFE applied by gun spraying two coats of system 458Z 62510/455Z 69801 supplied by E.I. DuPont de Nemours, Inc. on clean Pyrex[R] articles, without any pretreatment, with the adhesion on same articles previously coated with gamma-aminopropyltriethoxysilane, abbreviated γ-APTES, at 1% v/v in 95% ethanol, and with the adhesion of same articles previously coated with an aqueous composition of polyamic-acid (chemical supplied under reference 8470 A XYLAN[R]), with 1% v/v of γ-APTES. The silane precoating has been applied by spraying on substrates preheated at 100° C. in order to evaporate ethanol. The precoating consisting of the aqueous composition of polyamic-acid and γ-APTES has been sprayed on the glass, then treated at 100° C. in order to convert the polyamic-acid into polyamide-imide, which is the precoating in accordance with the invention.

The adhesion force, or ploughing force, F is measured on coated samples, before and after thermal aging at 250° C., and after 1 h and 4 h of chemical aging in the sodium carbonate solution. The results of said tests are collected in Table I; the standard deviation o on the values of F in this example is 1.0 N.

TABLE I

| Treatment of the Pyrex ® substrate | Ploughing force: F; standard deviation 1.0 N | | | |
|---|---|---|---|---|
| | Before ageing | After thermal ageing at 250° C. | After chemical ageing | |
| | | | 1 h | 4 h |
| Nil | 4,2 | 5,6 | 6,0 | 0,0 |
| γ-APTES at 1% in ethanol at 95% | 5,4 | 5,7 | 7,3 | 5,5 |
| 8470 A XYLAN ® + 1% of γ-APTES (along the invention) | 8,4 | 6,5 | 7,8 | 7,7 |

EXAMPLE 2

The same modus operandi as in example 1 is used except replacement of 1% v/v γ-APTES added to 8470 A XYLAN$^R$ by 5% v/v. The ploughing force F, with $\sigma=1.0$ N, reaches now more than 11.8 N before aging, (instead of 5.0 N), 9.9 N after thermal aging at 250° C., and 9.3 and 8.1 N after chemical aging of 1 h and 4 h respectively.

EXAMPLE 3

In this example, we compare the adhesion of a non-stick coating, about 20 μm thick, consisting of a layer of silicone resins, supplied by Dow Corning Corp. under the codes Q1-2531 and 6-2230, applied by spraying, then cured for 20 min. at 250° C. on clean Pyrex$^R$ substrates, either without any pretreatment, or provided with a precoating of γ-APTES at 1% v/v applied either as a solution in ethanol at 95% sprayed on a substrate preheated at 100° C. or as an aqueous solution sprayed on a substrate preheated at 200° C., or provided with a precoating similar to the precoating of example 2 dried at 100° C.

The adhesion force F is measured on the coated samples before and after thermal aging at 200° and 250° C., and after ¼ h, ½ h, 1 h, 2 h and 3 h of chemical aging in a sodium carbonate solution. The results are collected in Table II.

TABLE III

| Treatment of the Pyrex ® substrate | Ploughing force: F; $\sigma = 2,0$ N | | | |
|---|---|---|---|---|
| | Before ageing | After thermal ageing at 200° C. | After chemical ageing | |
| | | | 1 h | 4 h |
| Nil | 4,1 | 2,1 | 4,6 | 3,5 |
| γ-APTES at 1% in ethanol at 95% T = 100° C. | 3,8 | 3,3 | 5,7 | 6,2 |
| 8470 A XYLAN ® + 5% of γ-APTES (along the invention) | 9,8 | 8,0 | 8,2 | 7,8 |

EXAMPLE 5

The same procedure as in example 4 is used, except for the silane concentration in the 8470 A XYLAN$^R$ precoating, which is 2.5% v/v of γ-APTES instead of 5%.

The ploughing force F, with $\sigma=2.0$ N, is here 8.9 N before aging, 9.9 N after thermal aging at 200° C., and 11.8 and 10.8 N after chemical aging for 1 h and 4 h respectively.

EXAMPLE 6

The same procedure as in example 4 is used, except for the silane concentration in the 8470 A XYLAN$^R$ precoating, which is 1% v/v of γ-APTES instead of 5%.

The ploughing force F, with $\sigma=2.0$ N, is here 8.1 N before aging, 7.8 N after thermal aging at 200° C., and 7.7 and 9.7 N after chemical aging for 1 h and 2 h respectively.

EXAMPLE 7

In this example, we compare the adhesion of a non-stick coating, about 20 μm thick, made by gun spraying of a layer of 8830 XYLAN$^R$, a non-stick coating composition based on PTFE supplied by Whitford Plastics Ltd., on Pyrex$^R$ glass substrates and curing of said coating at 390° C. for 20 min., aforesaid substrates being either without any pretreatment, or provided with a precoating consisting in an aqueous composition of

TABLE II

| TREATMENT OF THE PyREX ® SUBSTRATE | Ploughing force: F; $\sigma = 1,0$ N | | | | | | | |
|---|---|---|---|---|---|---|---|---|
| | Before ageing | After thermal ageing | | After chemical ageing | | | | |
| | | 250° C. | 250° C. | ¼ h | ½ h | 1 h | 2 h | 3 h |
| Nil | 1,9 | 1,7 | 1,1 fissuring | 2,1 | 2,3 | 2,4 | 3,0 | 2,3 |
| γ-APTES at 1% in ethanol at 95% T = 100° C. | 2,8 | 2,2 | 2,0 | 2,9 | 2,7 | 3,2 | 4,6 | 2,6 |
| γ-APTES at 1% in water T = 200° C. | 2,5 | 2,9 | 1,7 fissuring | 3,3 | 3,6 | 2,9 | 4,4 | 2,8 |
| 8470 A XYLAN ® + 1% γ-APTES (along the invention) | 5,0 | 4,7 | 2,8 | 6,7 | 4,9 | 3,7 | 5,9 | 4,7 |

EXAMPLE 4

The same procedure is used as in example 3, except for the thickness of the silicone non-stick coating, which is about 45 μm and for the concentration of silane in the polyamic-acid resin which is 5% v/v instead of 1%.

The results are given in Table III hereafter.

polyamic-acid (code 8470 A XYLAN$^R$) containing 3% v/v of γ-APTES according to the conventional modus operandi described in example 1.

The adhesion force F is measured on the samples before and after thermal aging at 250° C., and after 1 h of chemical aging. The results are collected in Table IV.

TABLE IV

| Treatment of the Pyrex ® substrate | Ploughing force: F; σ = 1,5 N | | |
|---|---|---|---|
| | Before ageing | After thermal ageing at 250° C. | After chemical ageing for 1 hour |
| Nil | 6,6 | 7,3 | 0 |
| 8570 A XYLAN ® + 3% γ-APTES (along the invention) | 10,8 | 9,5 | 10,8 |

EXAMPLE 8

The same procedure as in example 2 is used, except that the second layer of the PTFE coating made from the composition code 455 Z 69801 from E.I. DuPont de Nemours and Co., is replaced by the composition code 455 Z 69800 from the same company.

The adhesion of the non-stick coating on the substrates is tested with a conventional dishwasher, and evaluated by the number on washing cycles withstood by the coating before being damaged.

| Treatment of the Pyrex ® glass substrate | Number of washing cycles, N |
|---|---|
| Nil | 10 |
| 8470 A XYLAN + 5% γ-APTES (according to the invention | >169 |

EXAMPLE 9

In this example we compare, with the cross hatch test and the thumb nail test the adhesion of non-stick coatings based on PTFE made from the compositions code,459 523 and 456 396 supplied by E.I. DuPont de Nemours and Co., applied on Pyrex$^R$ glass cookware, said cookware being either without any precoating, or precoated with an aqueous composition of polyamic-acid (code 8470 XYLAN$^R$) containing 5% v/v of N-(beta-aminoethyl)-gamma-aminopropyltrimethoxysilane. The articles provided with this precoating successfully pass both tests after 1 h of chemical aging. On the contrary the articles without any precoating fail, the PTFE coating being easily removed, after 1 h of chemical aging, by the thumb nail.

EXAMPLE 10

In this example we compare the adhesion of non-stick coatings based on PTFE made from compositions code 459 523 and 456 396 supplied by E.I. DuPont de Nemours and Co. on stainless steel substrates (reference Z 6 CN 18.09) previously degreased with 1.1.1-trichlorethane then dried at 350° C., said substrates being either without any precoating or precoated with an aqueous composition of polyamic-acid (code 8470 A XYLAN$^R$) containing 3% v/v of γ-APTES.

The samples without precoating fail the thumb nail test after 1 h of chemical aging. The samples precoated according to the invention pass the test, even after 3 h of chemical aging.

The present invention has been particularly shown and described with reference to preferred embodiments thereof, however, it will be understood by those skilled in the art that various changes in the form and details may be made therein, and by using technical equivalents, without department from the true spirit and scope of the invention as defined by the following claims.

The samples without precoating fail the thumb nail test after 1 h of chemical aging. The samples precoated according to the invention pass the test, even after 3 h of chemical aging.

The above examples clearly demonstrate that the present invention provides means to substantially improve adhesion and durability of non-stick coatings on a variety of substrates. Moreover the process disclosed in this invention is particularly suitable for application at an industrial scale.

We claim:

1. A coated article comprising:
    a glass or glass-ceramic substrate
    a polyamide-imide film bonded to at least a portion of said substrate, the film being a reaction product of an organosilane and a polyamide-imide prepolymer; and
    a non-stick polymer layer bonded to at least a portion of said film, the non-stick polymer layer being formed of a material selected from the group consisting of silicone and fluorocarbon polymers.

2. A coated article in accordance with claim 1 which is an article of glass cookware and which comprises a non-stick polymer layer formed of a silicone polymer.

3. A coated article in accordance with claim 1 which is an article of glass-ceramic cookware comprising a non-stick polymer layer formed of a fluorocarbon polymer.

4. A coated article in accordance with claim 1 wherein the polyamide-imide film further comprises a coloring pigment.

* * * * *

UNITED STATES PATENT AND TRADEMARK OFFICE
CERTIFICATE OF CORRECTION

PATENT NO. : 4,961,996

DATED : October 9, 1990

INVENTOR(S) : Alain R. E. Carre and Francoise M. M. Roger

It is certified that error appears in the above-identified patent and that said Letters Patent is hereby corrected as shown below:

Column 4, line 47, "of-" should read --of--.

Column 5, line 1, "o" should read --σ--.

Column 5, lines 3 through 14, each " , " appearing within Table I should read -- . --.

Column 5, lines 44 through 61, each " , " appearing within Table II should read -- . --.

Column 5, line 47, "PyREX" should read --PYREX--.

Column 5, line 48, in the 3 h column, "2,3" should read --2.2--.

Column 6, lines 1 through 12, each " , " appearing within Table III should read -- . --.

Column 7, lines 1 through 9, each " , " appearing within Table IV should read -- . --.

Column 7, line 36, "de,459" should read --de 459--.

Signed and Sealed this

Twenty-sixth Day of May, 1992

*Attest:*

DOUGLAS B. COMER

*Attesting Officer*  *Acting Commissioner of Patents and Trademarks*